(12) United States Patent
Nie (10) Patent No.: US 11,089,725 B2
(45) Date of Patent: Aug. 17, 2021

(54) GRASS CUTTING HEAD AND GRASS TRIMMER INCLUDING THE SAME

(71) Applicant: Nanjing Chervon Industry Co., Ltd., Nanjing (CN)

(72) Inventor: Fangjie Nie, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/156,969

(22) Filed: Jan. 25, 2021

(65) Prior Publication Data

US 2021/0137004 A1    May 13, 2021

Related U.S. Application Data

(63) Continuation of application No. PCT/CN2019/096982, filed on Jul. 22, 2019.

(30) Foreign Application Priority Data

Aug. 7, 2017  (CN) .......................... 201810891350.X (51) Int. Cl.
*A01D 34/416* (2006.01)
*A01D 101/00* (2006.01)

(52) U.S. Cl.
CPC ..... *A01D 34/4166* (2013.01); *A01D 34/4163* (2013.01); *A01D 2101/00* (2013.01)

(58) Field of Classification Search
None
See application file for complete search history.

(56) References Cited

U.S. PATENT DOCUMENTS

| | | | | |
|---|---|---|---|---|
| 4,183,138 A | * | 1/1980 | Mitchell | A01D 34/4163 30/276 |
| 4,285,127 A | * | 8/1981 | Zerrer | A01D 34/4162 30/276 |
| 4,419,822 A | * | 12/1983 | Harris | A01D 34/4163 30/276 |
| 4,490,910 A | * | 1/1985 | Mattson | A01D 34/416 30/276 |
| 4,702,005 A | * | 10/1987 | Pittinger, Sr. | A01D 34/4163 30/276 |
| 4,817,288 A | * | 4/1989 | Hirose | A01D 34/4162 30/276 |

(Continued)

FOREIGN PATENT DOCUMENTS

| | | |
|---|---|---|
| CN | 2731956 Y | 10/2005 |
| CN | 103202136 A | 7/2013 |

(Continued)

OTHER PUBLICATIONS

Canadian Patent Office, Office Action issued on Canadian patent application No. 3,108,590, dated Mar. 4, 2021, 5 pages.

(Continued)

*Primary Examiner* — Hwei-Siu C Payer
(74) *Attorney, Agent, or Firm* — Greenberg Traurig, LLP (57) ABSTRACT

A grass trimmer includes a grass cutting head and a driving mechanism. The grass cutting head includes a head housing, a spool, and a clutch mechanism. The clutch mechanism is configured to implement power transmission between the head housing and the spool. The clutch mechanism includes an elastic member which is elastically deformable.

13 Claims, 11 Drawing Sheets

(56) References Cited

U.S. PATENT DOCUMENTS

| | | | |
|---|---|---|---|
| 8,266,805 B1* | 9/2012 | Alliss | A01D 34/4163 30/276 |
| 10,517,210 B2* | 12/2019 | Cabrera | A01D 34/4166 |
| 2010/0064530 A1* | 3/2010 | Pfaltzgraff | A01D 34/4163 30/276 |
| 2015/0342116 A1* | 12/2015 | Sprungman | A01D 34/4166 30/276 |
| 2017/0238461 A1* | 8/2017 | Cabrera | A01D 34/733 |
| 2018/0020615 A1* | 1/2018 | Alliss | A01D 34/4163 30/276 |
| 2021/0137004 A1* | 5/2021 | Nie | A01D 34/4161 |

FOREIGN PATENT DOCUMENTS

| | | |
|---|---|---|
| CN | 106922276 A | 7/2017 |
| JP | 2010119353 A | 6/2010 |
| JP | 2014121283 A | 7/2014 |

OTHER PUBLICATIONS

ISA/CN, Int. Search Report issued on PCT application No. PCT/CN2019/096982, dated Oct. 21, 2019, 2 pages.

\* cited by examiner

GRASS CUTTING HEAD AND GRASS TRIMMER INCLUDING THE SAME

RELATED APPLICATION INFORMATION

The present application is a continuation of International Application Number PCT/CN2019/096982, filed on Jul. 22, 2019, through which this application also claims the benefit of Chinese Patent Application No. 201810891350.X filed on Aug. 7, 2018, which applications are incorporated herein by reference in their entirety.

BACKGROUND

A grass trimmer is a common garden tool. It typically uses a motor or engine to drive a grass cutting head of the grass trimmer to rotate at a high speed. A flexible cutting line is wound around a spool, and the spool is accommodated in the grass cutting head. Ends of the flexible cutting line extend through holes in the housing of the grass cutting head. When the grass cutting head is rotating at a high speed, the flexible cutting line will also rotate with the grass cutting head at a high speed thus realizing the cutting function.

If the flexible cutting line extending from the housing of the grass cutting head is broken up or worn out, new portions of the cutting line need to be released from the spool. In the related art, the line release of the grass cutting head is performed in manual, tapping, and automatic manners. If the entire flexible cutting line on the spool has been used up, then a new cutting line needs to be added to the spool. In the related art, the winding methods mainly include automatic winding and manual winding. Both require that the cutting line be passed through the spool and that the housing or the spool be turned to wind the cutting line on the spool. This requires that the housing rotate relative to the spool, overcoming the friction between the housing and the contact surface of the spool. In the related art, this purpose is achieved by providing a mechanical clutch structure between the contact surfaces, the mechanical clutch structure mostly being a rigid clutch structure. As a result, there is a relatively heavy load for the user when performing the winding operation, making the winding operation very laborious, wasting the user's time and affecting the user's work efficiency.

SUMMARY

In one example of the disclosure, a grass trimmer includes a grass cutting head and a driving mechanism. The grass cutting head is configured to cut the grass. The driving mechanism is configured to drive the grass cutting head to rotate in a first rotational direction around a rotational axis. The grass cutting head includes a head housing, a spool, and a clutch mechanism. The spool is provided with a winding portion. The clutch mechanism is configured to implement power transmission between the head housing and the spool. The clutch mechanism has a first state by which the head housing and the spool are operative to rotate together and a second state by which the spool is allowed to rotate in the first rotational direction relative to the head housing or a second rotational direction opposite to the first rotational direction relative to the head housing. The clutch mechanism includes an elastic member which is elastically-deformable. The elastic member has at least a first form and a second form. In the case where the clutch mechanism is in the first state, the elastic member is in the first form; and in the case where the clutch mechanism is in the second state, the elastic member is in the second form.

In one example of the disclosure, a grass cutting head includes a head housing, a spool, and a clutch mechanism. The spool is provided with a winding portion. The clutch mechanism is configured to achieve power transmission between the head housing and the spool. The clutch mechanism has a first state by which the head housing and the spool rotate together and a second state by which the spool is allowed to rotate in a first rotational direction relative to the head housing or a second rotational direction opposite to the first rotational direction relative to the head housing. The clutch mechanism includes an elastic member which is elastically-deformable. The elastic member has a first form and a second form. The elastic member is configured to be in the first form in the case where the clutch mechanism is in the first state; and the elastic member is further configured to be in the second form in the case where the clutch mechanism is in the second state.

In one example of the disclosure, a grass trimmer includes a grass cutting head and a driving mechanism. The grass cutting head is configured to cut the grass. The driving mechanism is configured to drive the grass cutting head to rotate in a first rotational direction around a rotational axis. The grass cutting head includes a head housing, a spool, and a clutch mechanism. The spool is provided with a winding portion. The clutch mechanism is configured to implement power transmission between the head housing and the spool. The clutch mechanism has a first state by which the head housing and the spool are operative to rotate together and a second state by which the spool is allowed to rotate in a second rotational direction opposite to the first rotational direction relative to the head housing. The clutch mechanism includes a first magnetic component and a second magnetic component. The first magnetic component is disposed in the head housing, and the second magnetic component is disposed on the spool. Alternatively, the first magnetic component is disposed on the spool, and the second magnetic component is disposed in the head housing. There is created a magnetic force between the first magnetic component and the second magnetic component. The first magnetic component is configured such that a repulsive force between the first magnetic component and the second magnetic component is greater than an attractive force between the first magnetic component and the second magnetic component in the case where the clutch mechanism is in the second state.

DETAILED DESCRIPTION

Figure 1:
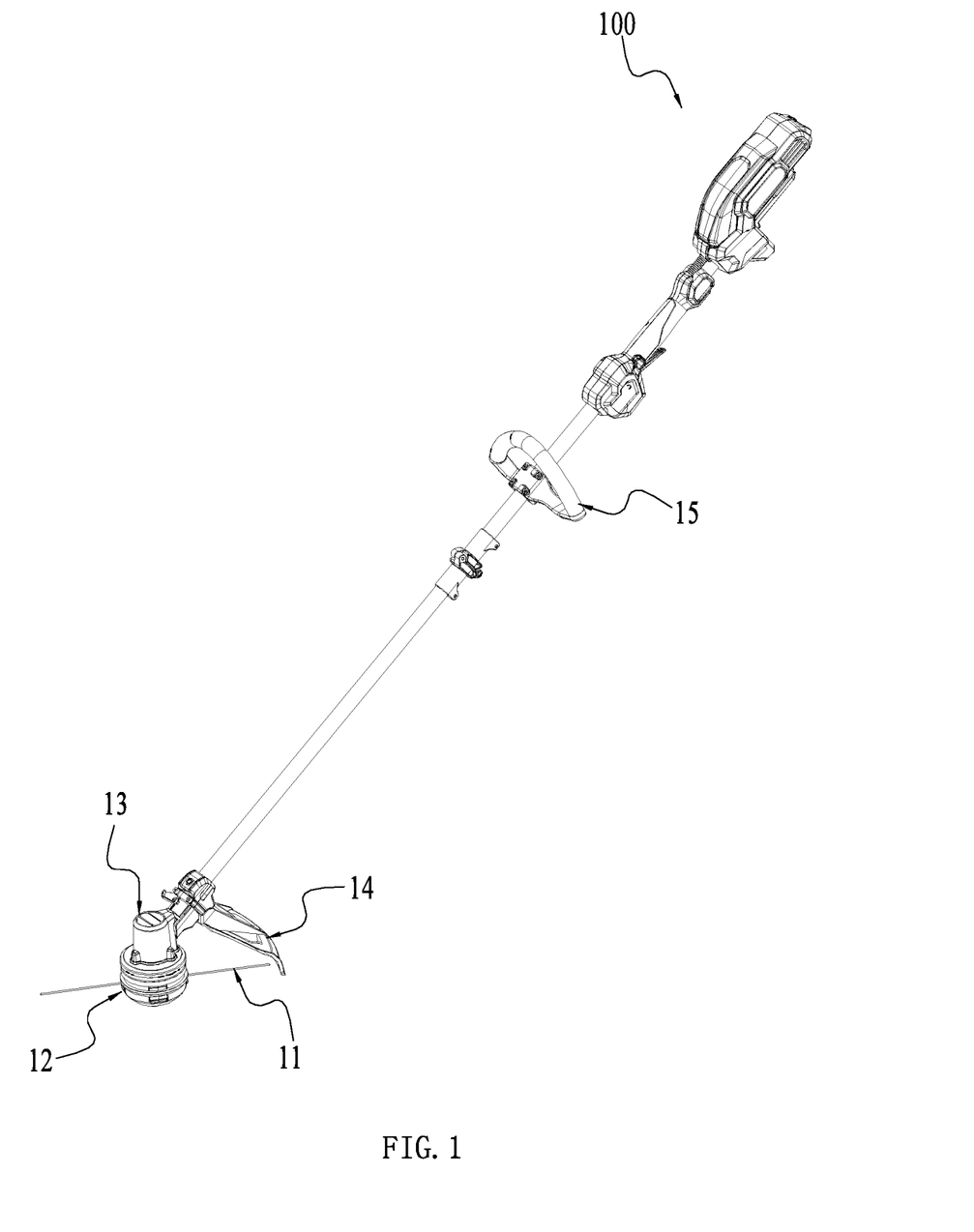
FIG. 1 is a schematic view of a grass trimmer according to a first example of this application.

FIG. 1 is a schematic view of a grass trimmer 100 according to a first example of this application. In this application, the winding method of the grass trimmer 100 may be manual winding or automatic winding, or one of the multiple winding methods switched according to actual operation scenarios. The grass trimmer 100 has a grass trimming mode, a winding mode, and a cord releasing mode. The three modes correspond to grass trimming, winding, and the pay-off operation, respectively.

Figure 2:
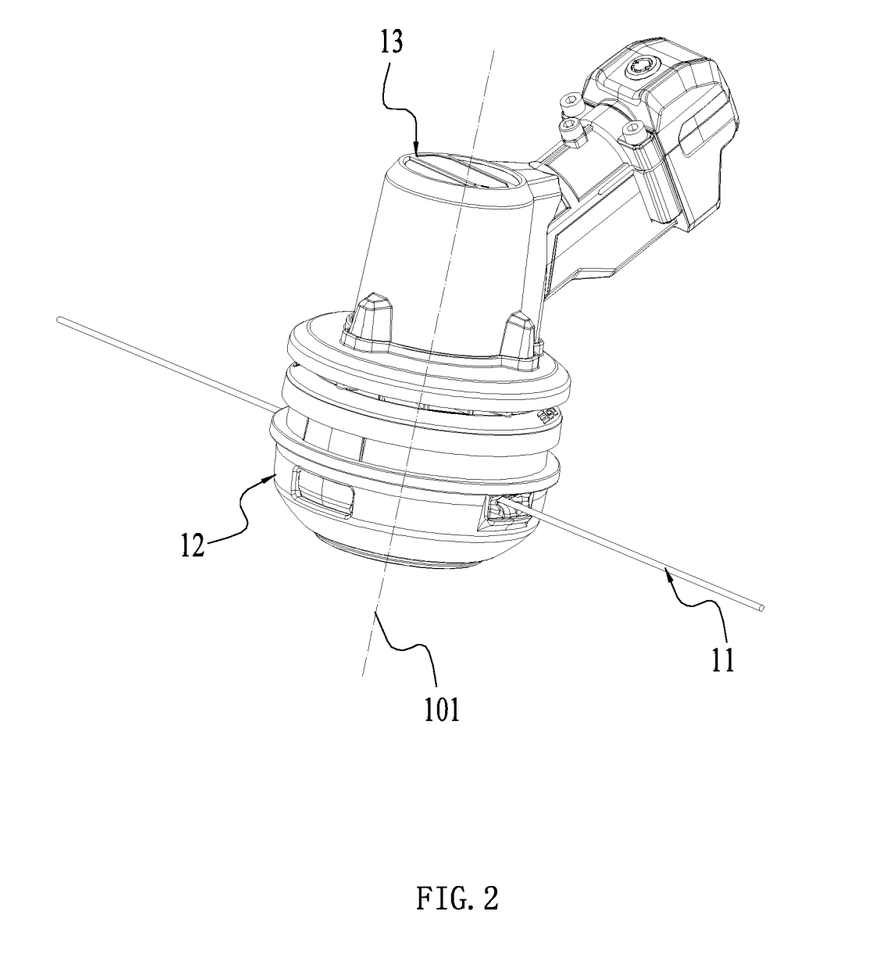
FIG. 2 is a perspective view of a partial structure of the grass trimmer of FIG. 1.

As illustrated in FIG. 1 and FIG. 2, the grass trimmer 100 includes a grass cutting cord 11, a grass cutting head 12, and a driving mechanism 13. The grass cutting head 12 is configured to cooperate with the grass cutting cord 11 to trim the grass. The driving mechanism 13 drives the grass cutting head 12 to rotate in a first rotational direction with a rotational axis 101 as an axis. The grass trimmer 100 further includes a shield 14 for preventing grass clippings from being splashed and a handle 15 for the user to operate.

Figure 3:
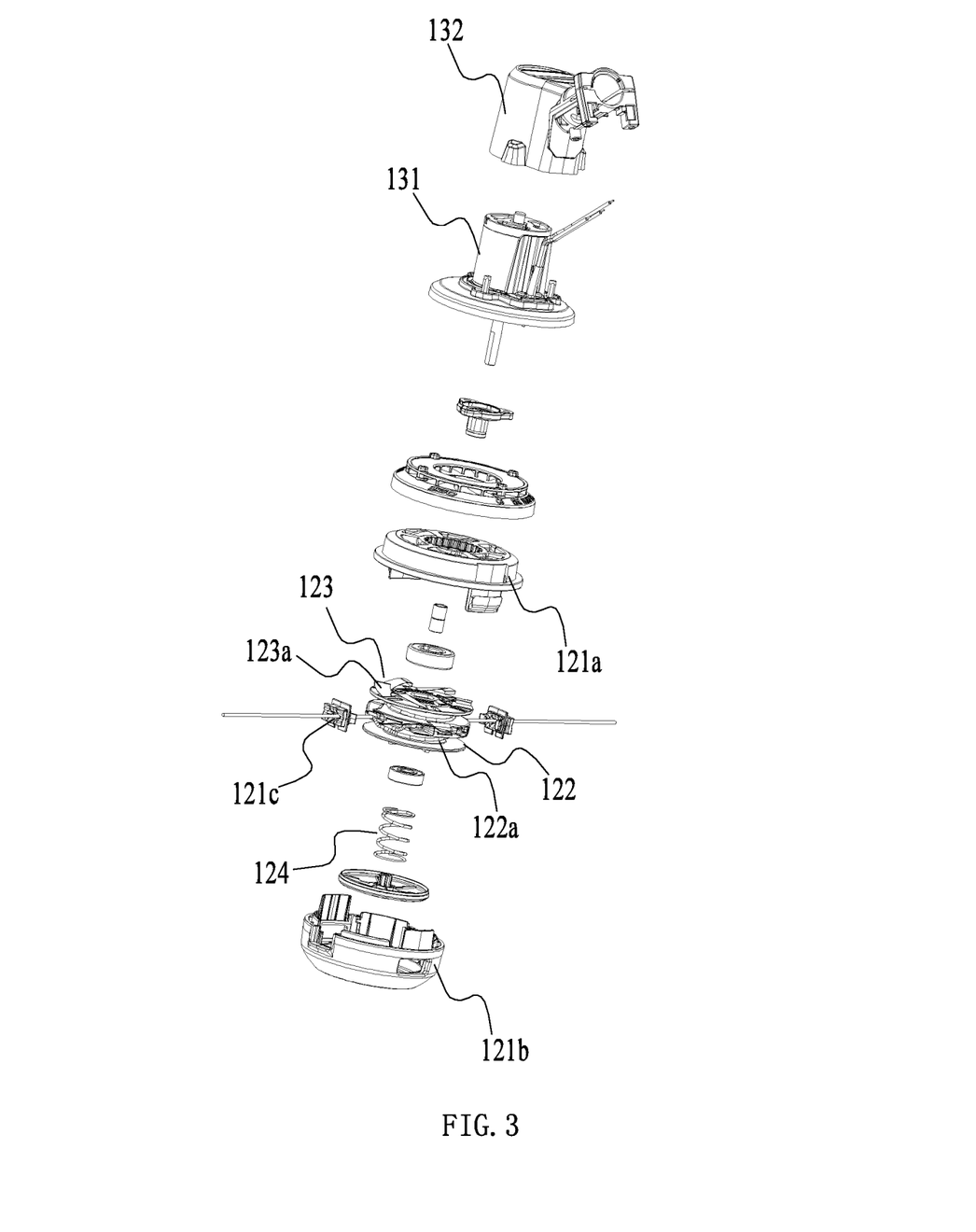
FIG. 3 is an exploded view of the partial structure of the grass trimmer of FIG. 1.
Figure 4:
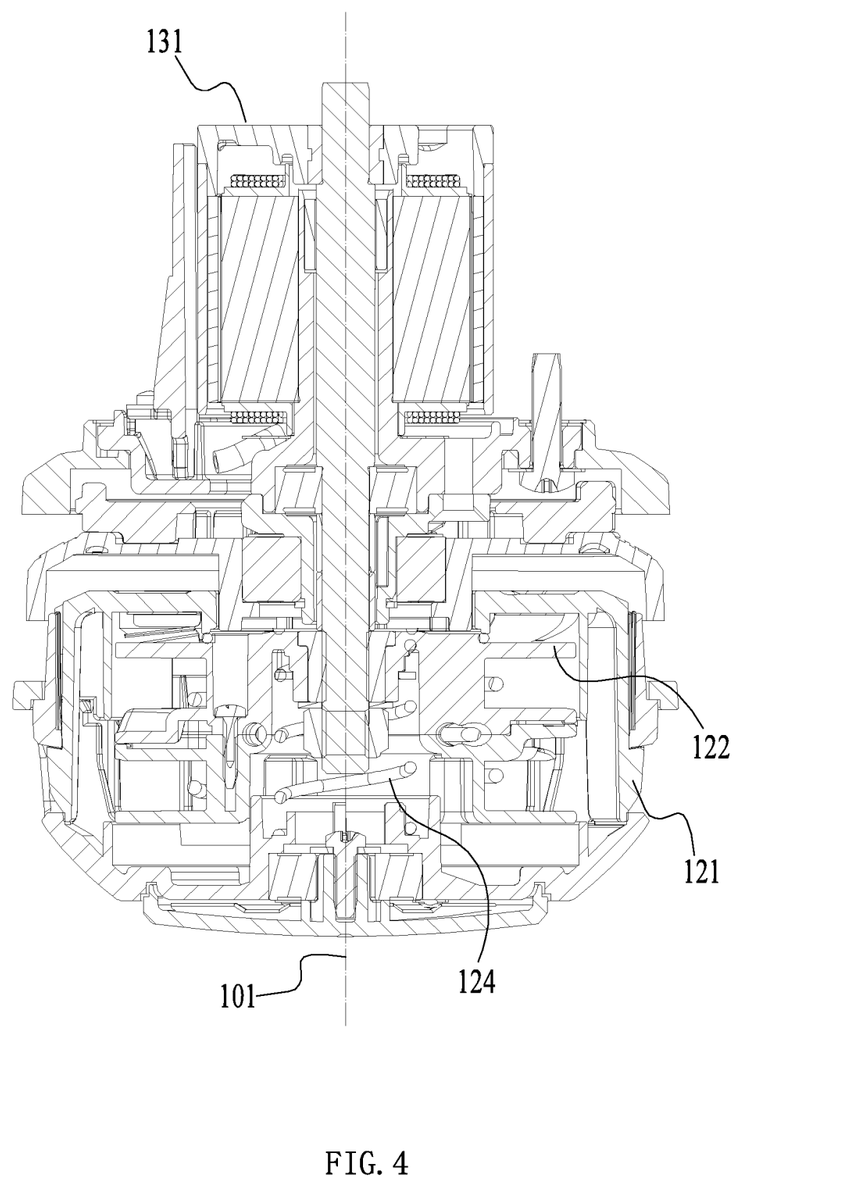
FIG. 4 is a sectional view of the partial structure of the grass trimmer of FIG. 1.
Figure 5:
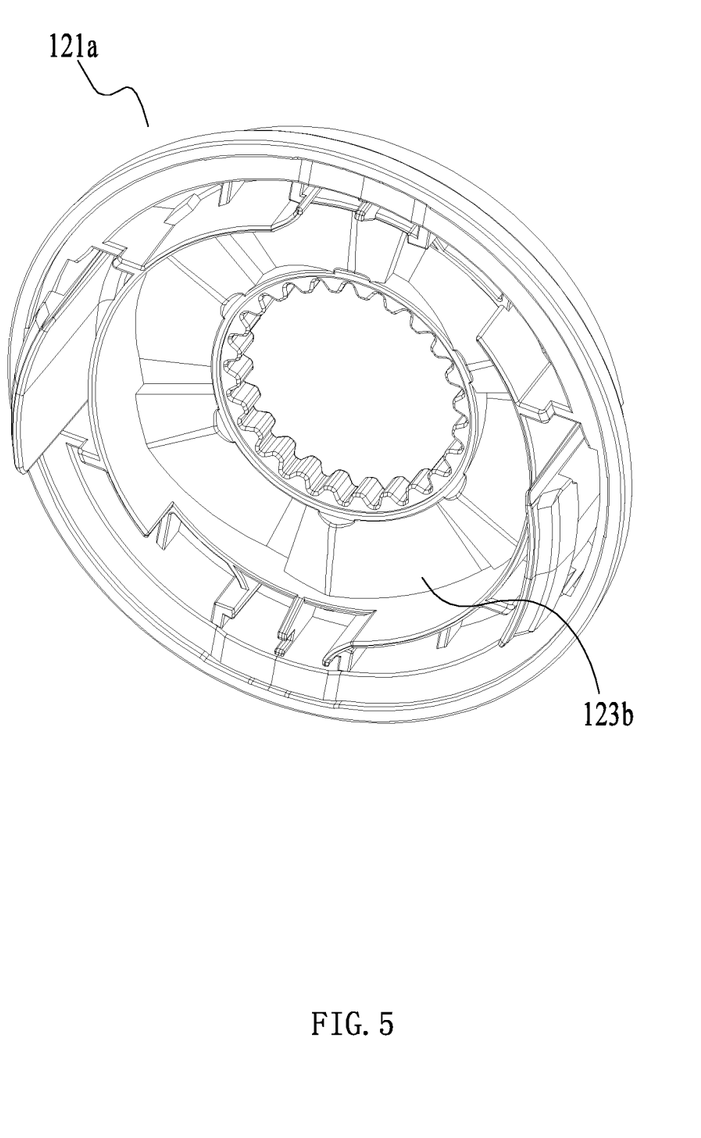
FIG. 5 is a perspective view of the partial structure of the grass trimmer of FIG. 1.

As illustrated in FIG. 3 and FIG. 4, the driving mechanism 13 includes a motor 131 and a motor housing 132. The motor 131 is configured to drive the grass cutting head 12 to rotate in the first rotational direction with the rotational axis 101 as the axis. The grass cutting head 12 includes a head housing 121, a spool or bobbin 122, and a clutch mechanism 123. The head housing 121 includes an upper cover 121a and a lower cover 121b that are detachably connected. The upper cover 121a and the lower cover 121b surround to form an accommodation space for accommodating the spool 122 and a threading hole 121c through which the grass cutting cord 11 passes. The spool 122 is provided with a winding portion 122a on which lines are wound.

The clutch mechanism 123 is configured to achieve power transmission between the head housing 121 and the spool 122. The clutch mechanism 123 has at least two states which are a first state and a second state. In the case where the clutch mechanism 123 is in the first state, the head housing 121 and the spool 122 rotate together in the first rotational direction with the rotational axis 101 as the axis.

In the case where the clutch mechanism 123 is in the second state, the spool 122 rotates in the first rotational direction relative to the head housing 121 or a second rotational direction relative to the head housing 121. That is, in the case where the clutch mechanism 123 is in the second state, the spool 122 rotates relative to the head housing 121 and the relative rotational direction may be the first direction or the second direction. Alternatively, the spool 122 may rotate in the first direction relative to the head housing 121 or the second direction relative to the head housing 121. Whether the spool 122 rotates in the second rotational direction relative to the head housing 121 or the first rotational direction relative to the head housing 121, the winding operation can be achieved as long as the spool 122 rotates relative to the head housing 121.

In an example, in the case where the grass cutting head 12 is in the normal grass trimming mode, the clutch mechanism 123 is in the first state; and in the case where the grass cutting head 12 is in the winding mode, the clutch mechanism 123 is in the second state. As illustrated in FIG. 3, the clutch mechanism 123 includes an elastic member 123a which is elastically-deformable. In the case where the clutch mechanism 123 is in the first state, the elastic member 123a is in the first form; and in the case where the clutch mechanism 123 is in the second state, the elastic member 123a is in the second form. That is, in the case where the grass cutting head 12 is switched from the grass trimming mode to the winding mode, the shape of the elastic member 123a of the clutch mechanism 123 changes.

The grass cutting head 12 further includes a biasing member 124 that generates a biasing force capable of driving the clutch mechanism 123 to move toward the first state. That is, the biasing force generated by the biasing member 124 makes the clutch mechanism 123 be in the first state or move the clutch mechanism 123 to the first state so that the spool 122 is driven to not rotate relative to the head housing 121.

The biasing member 124 generates the biasing force against the spool 122 or the head housing 121, that is, this biasing force generates a component force in a direction parallel to the rotational axis 101. In an example, the biasing member 124 is a coil spring disposed in a direction of the rotational axis 101 or the direction parallel to the rotational axis 101, and the coil spring is fixedly connected to the lower cover 121b of the head housing 121. In other examples, the structure of the biasing member 124 is not limited to a spring structure, but may also be other structural members that are elastically-deformable, as long as the biasing member 124 is capable of generating the biasing force against the head housing 121 or the spool 122 and the head housing 121 moves in an axial direction relative to the spool 122.

In an example, the grass trimmer 100 further has a cord releasing mode. In the case where the grass trimmer 11 is damaged, the head housing 121 or the spool 122 needs to be rotated so that a new grass cutting cord 11 is released. In the related art, the commonly used pay-off method is automatic pay-off. In the automatic pay-off, the head housing 121 moves in the axial direction relative to the spool 122, the head housing 121 and the spool 122 rotate in the first direction around the rotational axis 101, and the grass cutting cord 11 is thrown out of the spool 122 through the threading hole 121c by the centrifugal force. Through the design of the biasing member 124, the head housing 121 of the grass trimmer 100 may be made to move in the axial direction relative to the spool 122 in the case where the user hits the head housing 121 to the ground so that the automatic pay-off can be achieved. In an example, the biasing member 124 generates the biasing force against the spool 122 or the head housing 121 in the case where the grass trimmer 100 is in the grass trimming mode, winding mode, and cord releasing mode. Alternatively, the biasing member 124 generates the biasing force against the spool 122 or the head housing 121 only in the case where the grass trimmer 100 is in the cord releasing mode. Alternatively, the biasing member 124 generates the biasing force against the spool 122 or the head housing 121 only in the case where the grass trimmer 100 is in the cord releasing mode and the winding mode.

In this example, the biasing member 124 generates the biasing force against the spool 122 or the head housing 121 in the case where the grass trimmer 100 is in the grass trimming mode, winding mode, and cord releasing mode. The first end of the biasing member 124 is fixedly connected to the head housing 121, the second end of the biasing member 124 is in contact with the spool 122, and the biasing member 124 generates the biasing force against both the head housing 121 and the spool 122. In an example, the first end of the biasing member 124 may also be fixedly connected to the spool 122, and the second end of the biasing member 124 is in contact with the head housing 121.

The elastic member 123a is deformed in the direction parallel to the rotational axis 101 when changing from the first form to the second form. In an example, in the case where the clutch mechanism 123 is switched from the first state to the second state, the head housing 121 moves in the direction parallel to the rotational axis 101 relative to the spool 122. In the related art, the clutch mechanism 123 is not provided with the elastic member 123a. In this manner, in the case where the clutch mechanism 123 is switched from the first state to the second state, the relative displacement of the head housing 121 with respect to the spool 122 in the direction parallel to the rotational axis 101 comes from the elastic displacement of the further compressed biasing member 124 in this direction. The difference of this example is that the relative displacement of the head housing 121 with respect to the spool 122 in the direction parallel to the rotational axis 101 comes from the elastic deformation of the elastic member 123a in this direction or at least part of the relative displacement comes from the elastic deformation of the elastic member 123a in this direction. In this example, the entire relative displacement of the head housing 121 with respect to the spool 122 in the direction parallel to the rotational axis 101 basically comes from the elastic deformation of the elastic member 123a in this direction. In other examples, the biasing member 124 also moves in the direction parallel to the rotational axis 101 in the case where the grass cutting head 12 performs the winding. That is, in the case where the winding is performed, the relative displacement of the head housing 121 with respect to the spool 122 in the direction parallel to the rotational axis 101 may be provided by the elastic displacement of the elastic member 123a and the elastic displacement of the biasing member 124.

In the case where the clutch mechanism 123 is in the second state, part of the rotational torsion force received by the spool 122 or the head housing 121 is configured to resist the elastic force generated by the elastic member 123a. In the case where the grass cutting head 12 is in the winding mode, the clutch mechanism 123 is in the second state, the elastic member 123a is in the second state, and the relative rotation of the spool 122 or the head housing 121 is caused by the rotational torsion force. In this case, the elastic member 123a generates a component force whose direction is opposite to the direction of the rotational torsion force, part of the rotational torsion force is configured to overcome this component force, and the other part of the rotational torsion force is configured to drive the spool 122 and the head housing 121 to rotate relative to each other.

Figure 6:
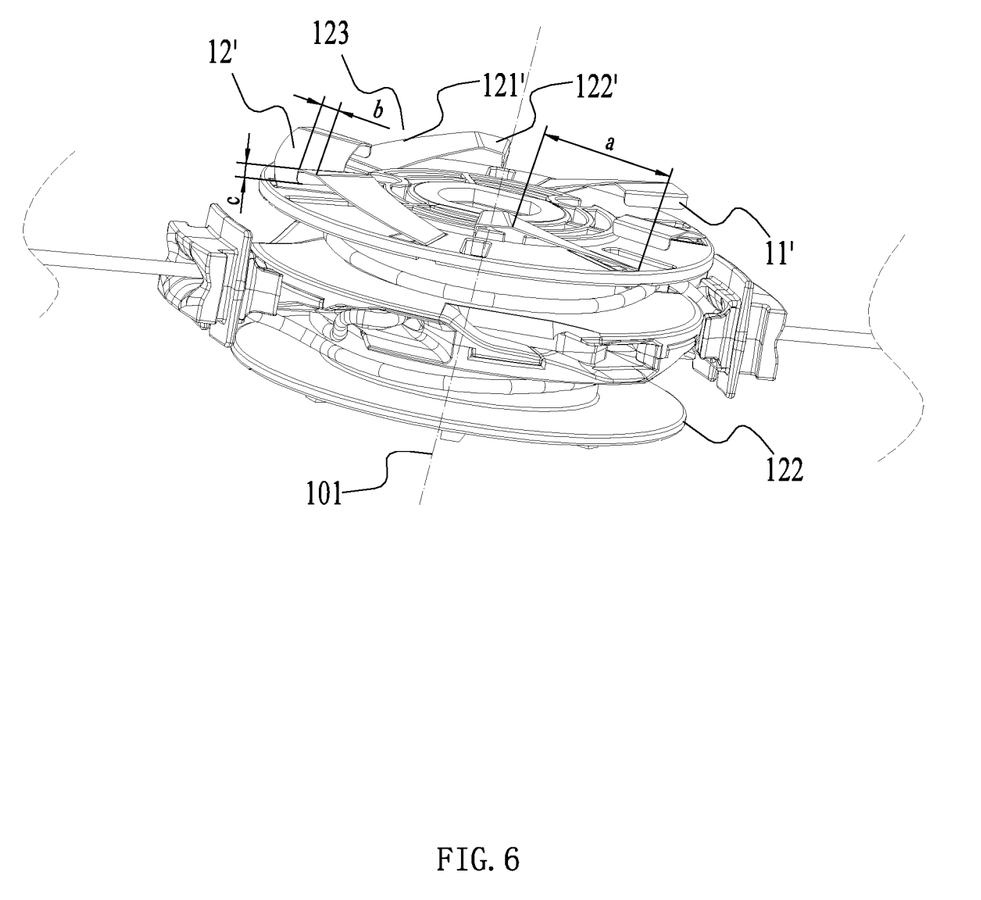
FIG. 6 is a perspective view of the partial structure of the grass trimmer of FIG. 1.

As illustrated in FIG. 5 to FIG. 8, the clutch mechanism 123 further includes a cooperating portion 123b configured to cooperate with the elastic member 123a to transmit power. The elastic member 123a is disposed on one of the spool 122 or the head housing 121, and the cooperating portion 123b is disposed on the other one of the spool 122 or the head housing 121. In this example, the elastic member 123a is disposed on the spool 122, and the cooperating portion 123b is disposed on the head housing 121 and is disposed in the upper cover 121a of the head housing 121. As illustrated in FIG. 6, the elastic member 123a is provided with a driving surface 11'. The driving surface 11' is substantially perpendicular to the end surface of the spool 122. In the case where the elastic member 123a is in the first form, the driving surface 11' drives the cooperating portion 123b to rotate along with the elastic member 123a in the first rotational direction. That is, in the case where the elastic member 123a is in the first form, the driving surface 11' of the elastic member 123a is configured to drive the head housing 121 to rotate together with the spool 122 in the first rotational direction. Specifically, the first direction is a clockwise direction or a counterclockwise direction around the rotational axis 101.

Figure 7:
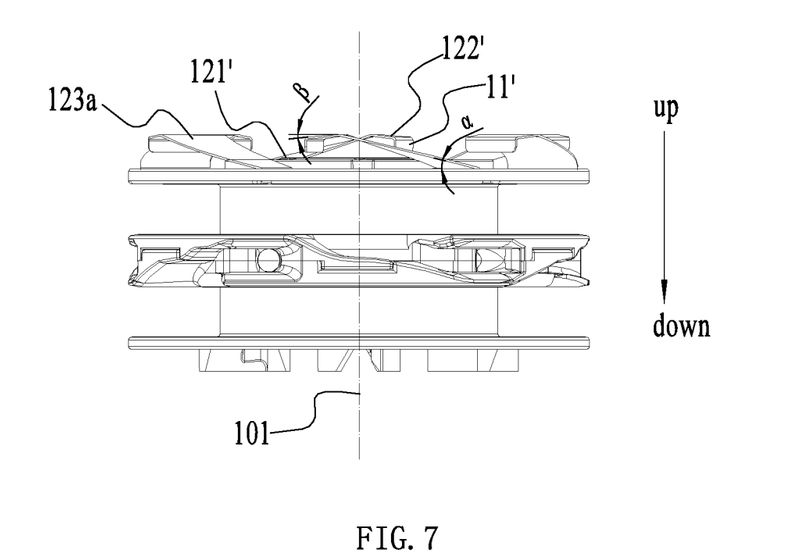
FIG. 7 is a front view of the spool of the grass trimmer of FIG. 1, where the elastic members are all in the first form.

The elastic member 123a is further provided with an elastic surface 12'. The elastic surface 12' allows the cooperating portion 123b to rotate in the second rotational direction relative to the elastic member 123a in the case where the elastic member 123a is in the second form. As illustrated in FIG. 6 and FIG. 7, the elastic surface 12' includes a first ramp 121' that forms a preset angle with the spool 122 and is tilted upward. In this example, the elastic surface 12' further includes a downward-tilted second ramp 122'. The first end of the second ramp 122' is connected to the first ramp 121' and the second end of the second ramp 122' is connected to the driving surface 11'. The cooperating portion 123b is provided with structures that cooperate with the driving surface 11' and the elastic surface 12', respectively. In an example, the driving surface 11' and the elastic surface 12' of the elastic member 123a may be a planar surface or a curved surface. Specifically, the second direction is a counterclockwise direction opposite to the first direction or a clockwise direction opposite to the first direction around the rotational axis 101.

Figure 8:
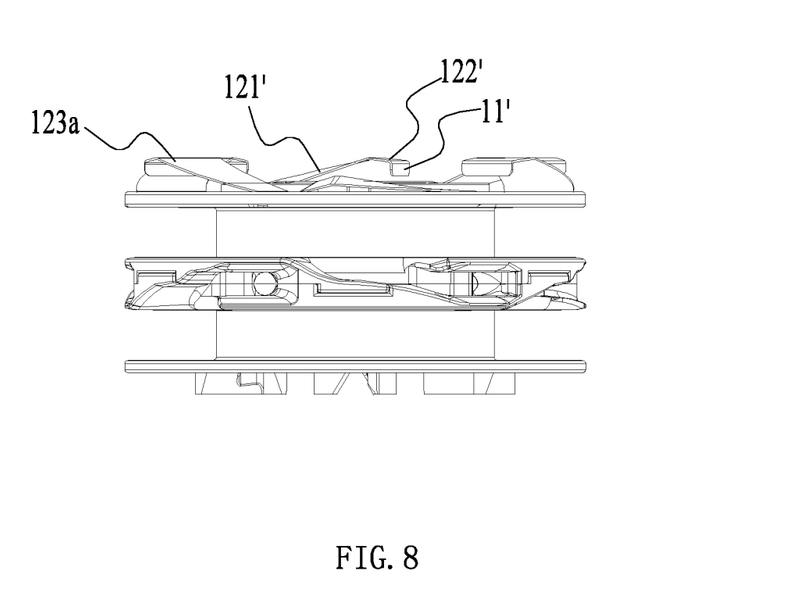
FIG. 8 is a front view of the spool of the grass trimmer of FIG. 1, where the elastic members are partially in the second form.

The first end of the elastic member 123a is fixedly connected to one end surface of the spool 122. The second end of the elastic member 123a is suspended in the air. The elastic member 123a extends obliquely upward in the circumferential direction of the spool 122, and a preset angle is formed by the elastic member 123a and the end surface of the spool 122. In an example, the elastic member 123a may also be integrally formed with the spool 122. In this example, the elastic member 123a is a metal elastic piece. In other examples, the elastic member 123a may be a plastic elastic piece. FIG. 7 is a planar view of the elastic member 123a in the first form. FIG. 8 is a planar view of the elastic member 123a in the second form. The elastic member 123a is deformed in the direction parallel to the rotational axis 101 when changing from the first form to the second form. For ease of description, the up and down directions are set in FIG. 7. The metal elastic piece is deformed downward in the direction parallel to the rotational axis 101 after acted by a force. In addition, in this example, six metal elastic pieces are uniformly disposed in the circumferential direction on the surface of the spool 122, but the number and material of the elastic pieces are not specifically limited in this example.

As illustrated in FIG. 6 and FIG. 7, the height c of the driving surface 11' perpendicular to the end surface of the spool 122 is about 2 mm, the length a of the first ramp 121' of the elastic member 123a is about 25 mm, and the length b of the first ramp 122' of the elastic member 123a is about 5 mm. The acute angle α formed by the first ramp 121' of the elastic member 123a and the end surface of the spool 122 is about 60°, and the acute angle β formed by the second ramp 122' of the elastic member 123a and the end surface of the spool 122 is approximately 5°. This example does not limit the specific structure of the elastic member 123*a*. In fact, the preceding parameter settings, especially the oblique angle formed by the first ramp 121' of the elastic member 123*a* and the end surface of the spool 122 and the oblique angle formed by the second ramp 122' of the elastic member 123*a* and the end surface of the spool 122 greatly reduce the load of the grass trimmer 100 when performing the winding, thereby reducing the power consumption of the motor 131. In this example, the output power of the grass trimmer 100 when performing the winding is less than or equal to 529 W. Comparing the grass trimmer in this example with the grass trimmer using a clutch mechanism with the same size as the clutch mechanism in this example but not elastically-deformable, the reduction in the output power of the motor 131 in the case where the winding is performed is greater than or equal to 30% in this example.

In this example, the driving surface 11' of the elastic member 123*a* is substantially perpendicular to the end surface of the spool 122. Therefore, in the case where the clutch mechanism 123 is in the second state, it is basically allowed that the spool 122 rotates in the second rotational direction opposite to the first rotational direction relative to the head housing 121.

In the grass trimmer and the grass cutting head of this grass trimmer provided in this example, a deformable clutch structure between the housing and the spool is adopted so that the load in the case where the winding is performed can be greatly reduced and it can be easier and labor-saving for the user to perform the winding. Therefore, the practicability of the grass cutting head can be improved.

Figure 9:
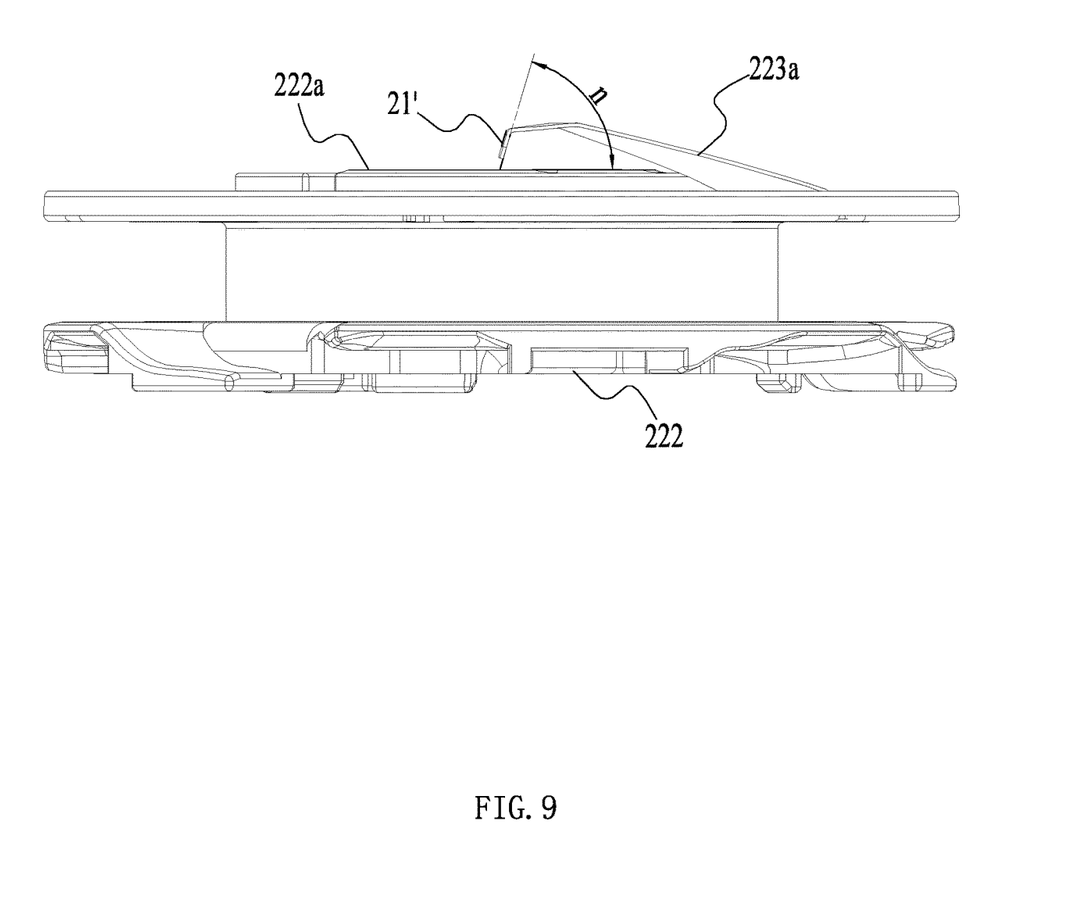
FIG. 9 is a schematic view of the partial structure of the spool and the clutch mechanism of the grass trimmer according to a second example of this application.

FIG. 9 is a schematic view of the partial structure of the spool 222 and the clutch mechanism according to a second example of this application. The difference between this example and the first example lies in the structure of the clutch mechanism. The parts in the first example and applicable to this example may be applied to this example, and only the difference between this example and the first example is described below. The driving surface 21' of the elastic member 223*a* is disposed at a non-zero acute angle to the vertical direction. In an example, the driving surface 21' of the elastic member 223*a* is obliquely downward with respect to the vertical direction and forms an acute angle n as shown in FIG. 9 with the upper-end surface 222*a* of the spool 222. The cooperating portion (not marked in the figure) is further provided with a ramp parallel to the driving surface 21'. The driving surface 21' and the ramp on the cooperating portion match each other in the case where the clutch mechanism is in the first state. The driving surface 21' drives the cooperating portion to rotate in the first rotational direction. In this case, the driving force in the first rotational direction received by the spool 222 is not large enough to cause the relative displacement between the driving surface 21' and the cooperating portion. In the case where the clutch mechanism is in the second state, the spool 222 receives a large enough driving force in the first rotational direction so that the relative displacement between the driving surface 21' and the cooperating portion occurs and the driving surface 21' rotates in the first rotational direction relative to the cooperating portion. In an example, the structures of the other parts of the elastic member 223*a* are the same as those illustrated in FIGS. 5 to 8. Therefore, in this example, the spool 222 can also rotate in the second rotational direction opposite to the first rotational direction relative to the head housing. That is, in this example, in the case where the clutch mechanism is in the second state, the spool 222 can rotate in the first direction or the second direction relative to the head housing.

Figure 10:
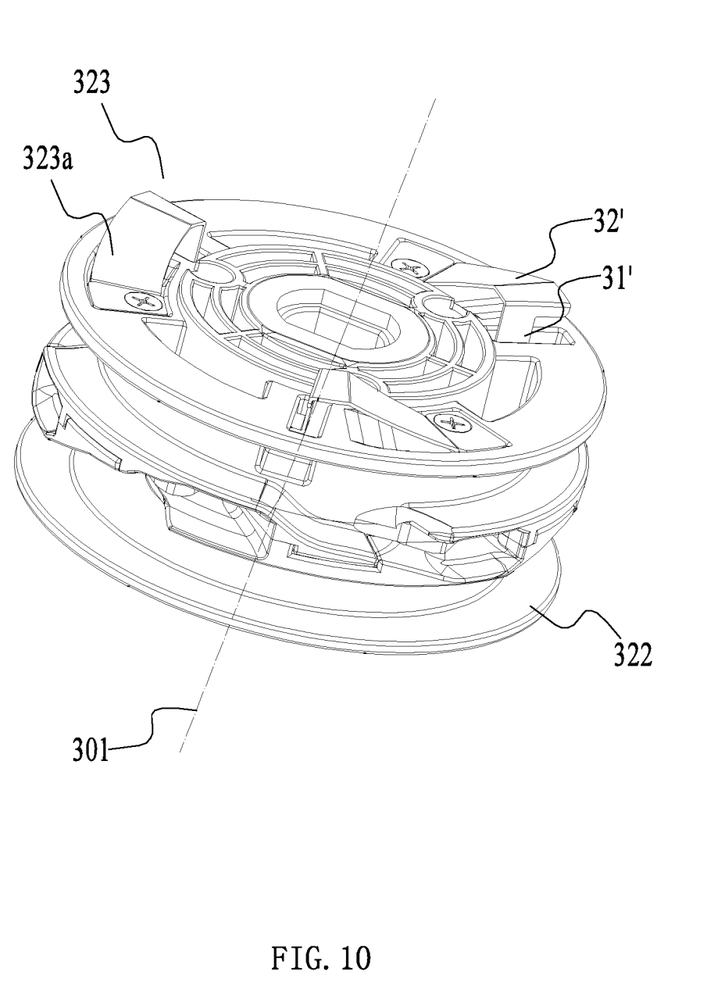
FIG. 10 is a perspective view of the spool of the grass cutting head according to a third example of this application.
Figure 11:
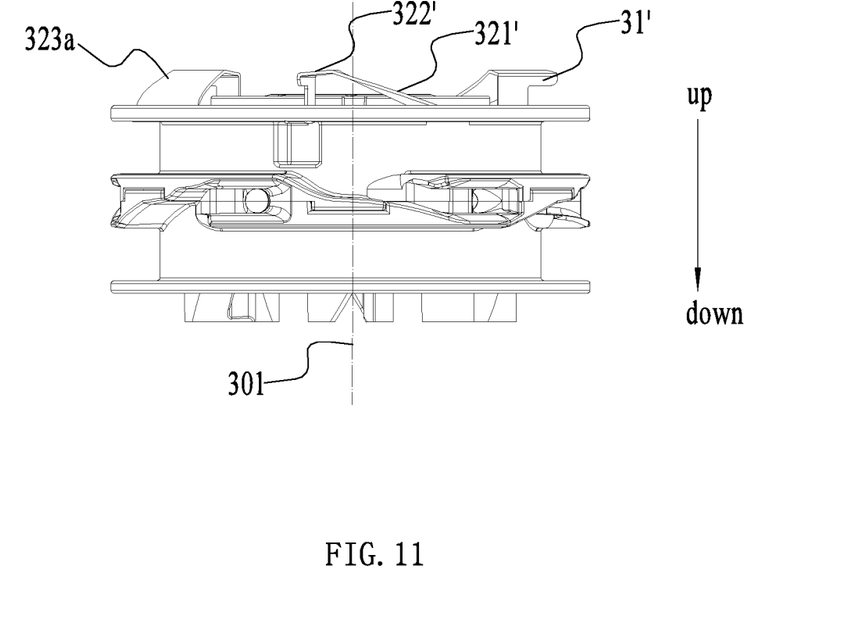
FIG. 11 is a front view of the spool of the grass trimmer of FIG. 10, where the elastic members are all in the first form.
Figure 12:
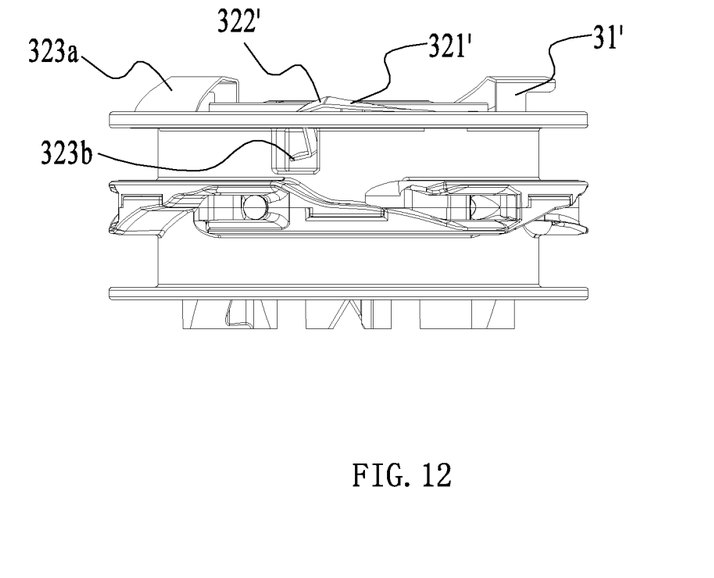
FIG. 12 is a front view of the spool of the grass trimmer of FIG. 10, where the elastic members are partially in the second form.

FIGS. 10 to 12 are structure views of the spool 322 and the elastic member 323*a* of the grass cutting head according to a third example of this application. The differences between this example and the first example only lie in the structures of the elastic member 323*a* and the spool 322. The parts in the first example and applicable to this example may be applied to this example, and only the differences between this example and the first example are described below.

FIG. 11 is a planar view of the elastic member 323*a* in the first form. FIG. 12 is a planar view of the elastic member 323*a* in the second form. The elastic member 323*a* is deformed in the direction parallel to the rotational axis 301 when changing from the first form to the second form. In this example, the elastic member 323*a* of the clutch mechanism 323 is a metal elastic piece, and three metal elastic pieces are uniformly disposed in the circumferential direction on the surface of the spool 322. Similarly, the number of the elastic pieces in this example is not limited. In an example, as long as the number of the elastic pieces is greater than or equal to 1, the function of the clutch mechanism 323 can be achieved. In this example, the elastic member 323*a* is provided with a driving surface 31'. This driving surface 31' is configured to drive the cooperating portion (not marked in the figure) to rotate with the elastic member 323*a* in the case where the elastic member 323*a* is in the first form. This driving surface 31' is perpendicular to the end surface of the spool 322. The elastic member 323*a* is further provided with an elastic surface 32'. This elastic surface 32' is configured to allow the cooperating portion to rotate relative to the elastic member 323*a* in the case where the elastic member 323*a* is in the second form. The elastic surface 32' includes a first ramp 321' that forms a preset angle with the spool 322 and is tilted upward. In this example, the elastic surface 32' further includes a second ramp 322' that is tilted downward. The first end of the elastic member 323*a* is fixedly connected to one end surface of the spool 322. The second end of the elastic member 323*a* is provided with a flange 323*b*. The flange 323*b* extends to the inside of the spool 322. In the case where the elastic member 323*a* is in the first form, the flange 323*b* abuts or is in contact with the spool 322 on a plane parallel to the end surface of the spool 322 to prevent the elastic member 323*a* from moving upward along with the cooperating portion in the case where the grass trimmer is in the cord releasing mode. In the case where the elastic member 323*a* is in the first form, the flange 323*b* is not in contact with the spool 322 on a plane parallel to the end surface of the spool 322. In the case where the elastic member 323*a* moves upward by a preset distance, the flange 323*b* abuts the spool 322 to prevent the elastic member 323*a* from moving excessively upward. In an example, the flange 323*b* only needs to be capable of preventing the elastic member 323*a* from moving excessively upward in the direction parallel to the rotational axis 301. That is, the following case is avoided: due to the excessive friction between the elastic member 323*a* and the cooperating portion, the relative displacement between the spool 322 and the head housing in the direction parallel to the rotational axis 301 does not occur.

Figure 13:
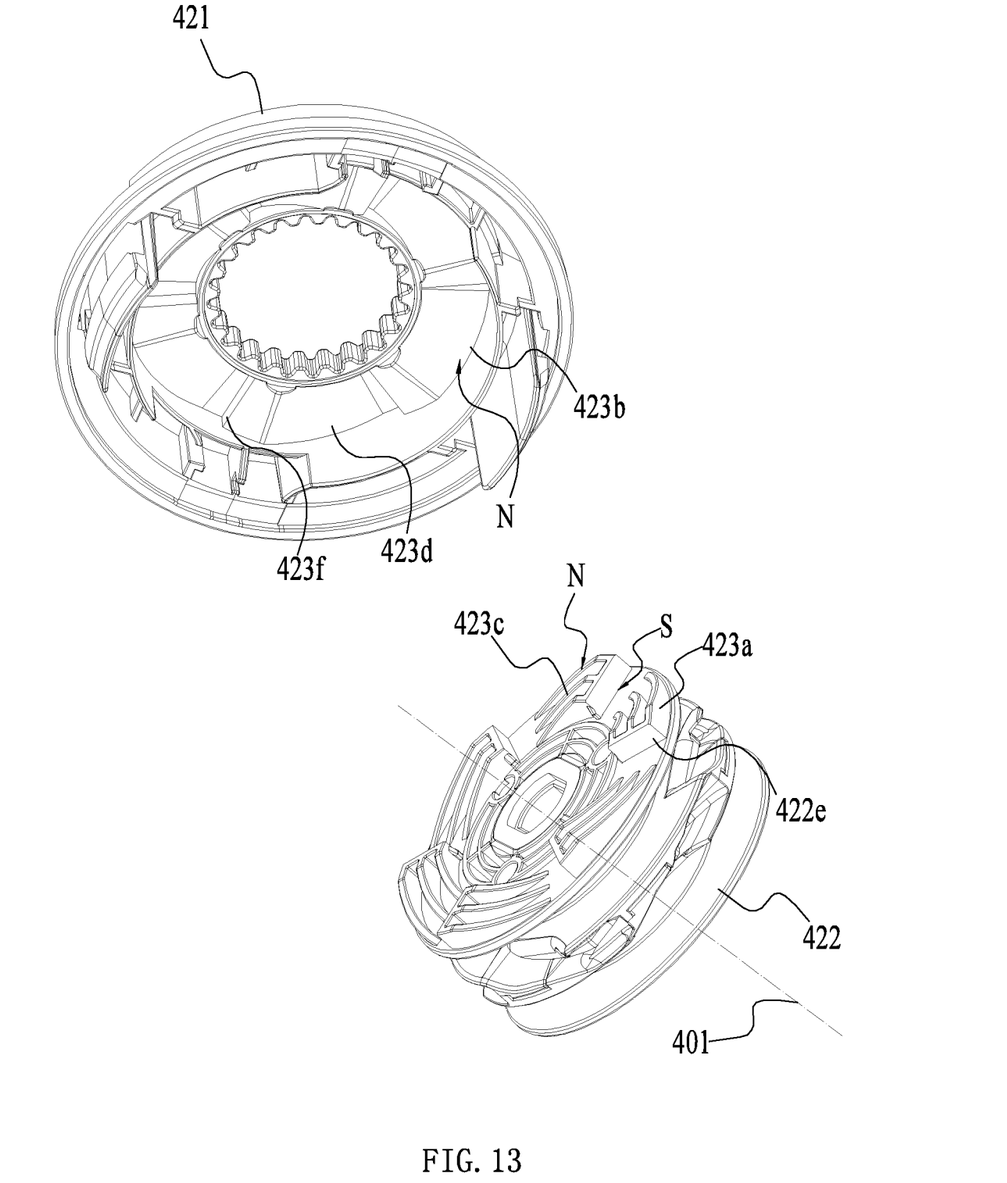
FIG. 13 is a schematic view of the spool, the head housing, and the clutch mechanism of the grass trimmer according to a fourth example of this application.

FIG. 13 is a schematic view of the spool 422 and the head housing 421 of the grass cutting head according to a fourth example of this application. The difference between this example and the previous three examples lies in the structure and working principle of the clutch mechanism. In this example, the clutch mechanism includes a first magnetic component and a second magnetic component. The first magnetic component is disposed on one of the head housing 421 or the spool 422, and the second magnetic component is disposed on the other one of the head housing 421 or the spool 422. A magnetic force is formed between the first magnetic component and the second magnetic component. In the case where the clutch mechanism is in the second state, the repulsive force between the first magnetic component and the second magnetic component is greater than the attractive force between the first magnetic component and the second magnetic component. The first magnetic component disposed on the spool 422 includes at least one first magnetic element 423a, and the second magnetic component disposed in the head housing 421 includes at least one second magnetic element 423b. The first magnetic element 423a and the second magnetic element 423b are made of magnetic materials. In the case where the clutch mechanism is in the second state, the first magnetic element 423a and the second magnetic element 423b match each other and have opposite magnetic poles, respectively.

In this example, the first magnetic element 423a is approximately in the shape of an oblique block. The first magnetic element 423a is provided with a ramp 423c. The magnetic pole where the ramp 423c is located is the N-pole or S-pole. The magnetic pole of the bottom surface of the first magnetic element 423a opposite to the ramp 423c is opposite to the magnetic pole of the ramp 423c. The second magnetic element 423b is provided with a matching ramp 423d that matches with the ramp 423c of the first magnetic component. The magnetic pole of the matching ramp 423d is opposite to the magnetic pole of the ramp 423c of the first magnetic component. In this manner, in the case where the clutch mechanism is in the second state, the repulsive force between the first magnetic component and the second magnetic component is greater than the attractive force between the first magnetic component and the second magnetic component, and the repulsive force between the opposite magnetic poles contributes a part of the force that presses the biasing member 124 downward so that the load in the case where the winding is performed can be reduced. The first magnetic element 423a further includes a driving surface 423e. The driving surface 423e is substantially perpendicular to the upper-end surface of the spool 422. The second magnetic element 423b is provided with a driven surface 423f that matches with the driving surface 423e. In the case where the clutch mechanism is in the first state, the driving surface 423e drives the driven surface 423f to rotate with the rotational axis 401 as the axis.

In this application, the structure of the clutch mechanism is not limited to the structure shown in the preceding four examples. In an example, an oblique wedge made of elastic materials may be disposed on the surface of the spool as an elastic member, and this oblique wedge may be molded onto the surface of the spool by over-injection. In other examples, both the head housing and the spool may be provided with elastically-deformable elastic structures that match each other. That is, the elastic member and the cooperating portion are elastically deformed in the case where the winding is performed. To sum up, any clutch mechanism which is elastically-deformable in the direction parallel to the rotational axis in the case where the grass cutting head performs the winding is within the scope of this application.

What is claimed is:

1. A grass trimmer, comprising:
a grass cutting head configured to cut grass; and
a driving mechanism configured to drive the grass cutting head to rotate in a first rotational direction around a rotational axis;
wherein the grass cutting head comprises a head housing, a spool comprising a winding portion, and a clutch mechanism configured to implement power transmission between the head housing and the spool, the clutch mechanism has a first state by which the head housing and the spool are operative to rotate synchronously and a second state by which the spool is operative to rotate in the first rotational direction relative to the head housing or in a second rotational direction opposite to the first rotational direction relative to the head housing, the clutch mechanism comprises an elastic member which is elastically deformable, the elastic member has at least a first form and a second form, and the elastic member is configured to be in the first form in a case where the clutch mechanism is in the first state and to be in the second form in a case where the clutch mechanism is in the second state.

2. The grass trimmer of claim 1, further comprising a biasing member configured to generate a biasing force that drives the clutch mechanism to move toward the first state.

3. The grass trimmer of claim 2, wherein the biasing member is configured to generate the biasing force in a direction parallel to the rotational axis of the grass cutting head and the elastic member is configured to be deformed in the direction parallel to the rotational axis in the process of changing from the first form to the second form.

4. The grass trimmer of claim 3, wherein the biasing member is a coil spring arranged along the rotational axis or parallel to the rotational axis.

5. The grass trimmer of claim 1, further comprising a biasing member, wherein the biasing member is configured to generate a biasing force against the spool or the head housing and, in the case where the clutch mechanism is in the second state, a rotational torsion force the spool or the head housing is subjected to is at least partially configured to resist an elastic force generated by the elastic member.

6. The grass trimmer of claim 1, further comprising a biasing member, wherein the biasing member is configured to generate a biasing force against the spool or the head housing in the case where the clutch mechanism is in the second state and the elastic member is configured to generate an elastic force against the spool or the head housing in the case where the clutch mechanism is in the second state.

7. The grass trimmer of claim 1, wherein the elastic member is integrally formed with the spool or the elastic member is integrally formed with the head housing.

8. The grass trimmer of claim 1, wherein the elastic member is arranged on the spool or the head housing.

9. The grass trimmer of claim 8, wherein the clutch mechanism further comprises a cooperating portion configured to cooperate with the elastic member to transmit power.

10. The grass trimmer of claim 9, wherein the elastic member is arranged on the spool and the cooperating portion is disposed on the head housing or the elastic member is disposed on the head housing and the cooperating portion is disposed on the spool, the elastic member comprises a driving surface and an elastic surface, the driving surface is configured to drive the cooperating portion to rotate with the elastic member in a case where the elastic member is in the first form, and the elastic surface is configured to cause the cooperating portion to rotate relative to the elastic member in a case where the elastic member is in the second form.

11. A grass cutting head, comprising:
a head housing;

a spool provided with a winding portion; and a clutch mechanism configured to implement power transmission between the head housing and the spool;

wherein the clutch mechanism has a first state by which the head housing and the spool are operative to rotate together and a second state by which the spool is operative to rotate in a first rotational direction relative to the head housing or in a second rotational direction opposite to the first rotational direction relative to the head housing, the clutch mechanism comprises an elastic member which is elastically-deformable, the elastic member has a first form and a second form, and the elastic member is configured to be in the first form in a case where the clutch mechanism is in the first state and to be in the second form in a case where the clutch mechanism is in the second state.

12. The grass cutting head of claim 11, further comprising a biasing member configured to generate a biasing force that drives the clutch mechanism to move toward the first state.

13. The grass cutting head of claim 12, wherein the biasing member is configured to generate the biasing force in a direction parallel to a rotational axis of the grass cutting head and the elastic member is configured to be deformed in the direction parallel to the rotational axis in the process of changing from the first form to the second form.

\* \* \* \* \*